U S010275512B2

(12) United States Patent
Nakamura et al.

(10) Patent No.: US 10,275,512 B2
(45) Date of Patent: Apr. 30, 2019

(54) INFORMATION PROCESSING APPARATUS AND INDEX DIMENSION EXTRACTING METHOD

(71) Applicants: FUJITSU LIMITED, Kawasaki-shi, Kanagawa (JP); University of Tsukuba, Tsukuba-shi, Ibaraki (JP)

(72) Inventors: Tomotake Nakamura, Numazu (JP); Ryuhei Harada, Ibaraki (JP); Yasuteru Shigeta, Ibaraki (JP)

(73) Assignees: FUJITSU LIMITED, Kawasaki (JP); UNIVERSITY OF TSUKUBA, Tsukuba (JP)

( * ) Notice: Subject to any disclaimer, the term of this patent is extended or adjusted under 35 U.S.C. 154(b) by 295 days.

(21) Appl. No.: 15/228,873

(22) Filed: Aug. 4, 2016

(65) Prior Publication Data
US 2017/0039268 A1    Feb. 9, 2017

(30) Foreign Application Priority Data
Aug. 7, 2015 (JP) .................... 2015-156703

(51) Int. Cl.
G06F 17/30    (2006.01)

(52) U.S. Cl.
CPC .. *G06F 17/30598* (2013.01); *G06F 17/30333* (2013.01); *G06F 17/30336* (2013.01); *G06F 17/30536* (2013.01); *G06F 17/30592* (2013.01)

(58) Field of Classification Search
USPC .................... 707/737, 741; 702/19; 703/2
See application file for complete search history.

(56) References Cited

U.S. PATENT DOCUMENTS

| 8,374,828 B1* | 2/2013 | Jacobs | ................ G06F 19/16 |
| | | | 435/4 |
| 2003/0130797 A1* | 7/2003 | Skolnick | ................ C07K 1/00 |
| | | | 702/19 |

(Continued)

FOREIGN PATENT DOCUMENTS

| JP | 2004-505334 | 2/2004 |
| JP | 2010-88451 | 4/2010 |

(Continued)

OTHER PUBLICATIONS

Japanese Platform for Patent Information, Publication No. 2010-88451, published Apr. 22, 2010.

(Continued)

*Primary Examiner* — Hung T Vy
(74) *Attorney, Agent, or Firm* — Staas & Halsey LLP

(57) ABSTRACT

An information processing apparatus includes: a memory configured to store a plurality of structures of a substance whose structure changes and a dimension group, which is a group of index dimensions that are indices for structural analysis of the substance, out of a plurality of dimensions that express the structure of the substance; and a processor configured to perform a procedure including: performing, for each of a plurality of candidate dimensions, which are not included in the dimension group, out of the plurality of dimensions, clustering of a plurality of structures in multi-dimensional space that has every index dimension included in the dimension group and a candidate dimension as coordinate axes; and adding a specified candidate dimension for which it is possible to generate a largest number of clusters to the dimension group as an index dimension.

6 Claims, 10 Drawing Sheets

(56) References Cited

U.S. PATENT DOCUMENTS

2003/0204315 A1  10/2003  Dukler et al.
2013/0304432 A1* 11/2013  Sander .................... G06F 19/16
                                                     703/2

FOREIGN PATENT DOCUMENTS

JP      2010-222300      10/2010
WO   WO 03/099999 A2  12/2003

OTHER PUBLICATIONS

Espacenet Bibliographic Data, Japanese Publication No. 2004-505334, published Feb. 19, 2004.
Japanese Platform for Patent Information, Publication No. 2010-222300, published Oct. 7, 2010.
Harada et al., "Protein Folding Pathways Extracted by OFLOOD: Outlier FLOODing Method", Journal of Computational Chemistry 2015, vol. 36, Nov. 3, 2014, pp. 97-102.
Nakamura et al., "FlexDice: A Fast Clustering Method for Large High Dimensional Data Sets", Information Processing Society of Japan (IPSJ) Transactions on Databases, vol. 46, No. SIG18(TOD28), Dec. 2015, pp. 40-49.
Naritomi et al., "Slow dynamics in protein fluctuations revealed by time-structure based independent component analysis: The case of domain motions", The Journal of Chemical Physics, vol. 134, Issue 6, Feb. 14, 2011, Cover page and pp. 065101-1 to 065101-8.
Sakuraba et al., "Detecting coupled collective motions in protein by independent subspace analysis", The Journal of Chemical Physics, vol. 133, Issue 18, Nov. 14, 2010, Cover page and pp. 185102-1 to 185102-10.

* cited by examiner

```
                    ┌─111a  STRUCTURE DATA
┌─────────────────────────────────────────────────────┐
│ STRUCTURE No.1                                      │
│                                                     │
│ ATOM  1 N   SER  A  96  x1  y1  z1  1.00  40.08   N │
│ ATOM  2 CA  SER  A  96  x2  y2  z2  1.00  32.83.08  C │
│                                                     │
│                                                     │
│                          ⋮                          │
│                                                     │
│                                                     │
└─────────────────────────────────────────────────────┘
```

FIG. 5

INFORMATION PROCESSING APPARATUS AND INDEX DIMENSION EXTRACTING METHOD

CROSS-REFERENCE TO RELATED APPLICATION

This application is based upon and claims the benefit of priority of the prior Japanese Patent Application No. 2015-156703, filed on Aug. 7, 2015, the entire contents of which are incorporated herein by reference.

FIELD the present embodiments discussed herein are related to an information processing apparatus and an index dimension extracting method.

BACKGROUND

The atoms that construct a protein gradually change positions, which means that the structure (or "conformation") of a protein changes over time technique used for a computer simulation of such structural changes in a protein is called "molecular dynamics" (MD) simulation.

In a MD simulation, the forces applied to respective, atoms disposed in an initial state from other atoms are calculated, and the movements of the atoms subjected to such forces are calculated based on Newton equation of motion. By doing so, the arrangement of the atoms after a certain time has elapsed from the initial arrangement is calculated. By repeating such calculation using a computer, it is possible to reproduce structural changes of a protein, which is useful for example in functional analysis of proteins.

A variety of methods have been proposed to reproduce structural changes in a protein by way of a MD simulation. One example of a method for reproducing structural changes in a protein using a MD simulation is 1.0 called "OFLOOD" where structural changes in a protein are sampled based on the detection of outliers.

With OFLOOD, clustering is performed on time series data of atomic coordinates or "trajectories") generated by MD simulation. Here, a "trajectory" is a group of atomic coordinates in a protein that can change over time. When OFLOOD is used, out of the protein structures included in a trajectory, a protein structure not included in any of the clusters is acquired as an "outlier". OFLOOD then executes a short-time MD simulation once again for the outlier. By doing so, it is possible to analyze functional changes in appropriate biomolecules with sufficient consideration to protein structures that rarely occur.

Note that a clustering method called "FlexDice" is used for the clustering performed during OFLOOD. FlexDice is a clustering method that gathers data elements in dense regions that are separated by sparse regions in a multi-dimensional data space in real time.

There are a variety of other technologies for analyzing protein structures. As one example, an analysis method that deconstructs into uncorrelated modes of fluctuation and extracts relevant modes of fluctuation with slow relaxation that lead to large-scale structural changes in a protein has been proposed. A method that detects collective motions in proteins by analyzing independent subspaces has also been proposed. A method for efficiently generating and screening protein libraries for optimized proteins with desirable biological functions has also been proposed. A technique that makes it possible to efficiently find functional peptides is also conceivable. In addition, a method that saves, searches, compares, and analyzes complex carbohydrates by expressing the complex carbohydrates using simple linear codes is conceivable.

See, for example, the following documents:
Japanese Laid-Open Patent Publication No. 2010-88451;
Japanese Laid-Open Patent Publication No. 2010-222300;
Japanese National Publication of international Patent Application No. 2004-505334;
Ryuhei Harada, Tomotake Nakamura, Yu Takano, and Yasuteru Shigeta, "Protein Folding Pathways Extracted by OFLOOD: Outlier FLOODing Method" Journal of Computational Chemistry, Jan. 15, 2015, Volume 36, Issue 2, pages 97-102;
Tomotake Nakamura, Yoko Kamidoi, Shinichi Wakabayashi, and Noriyoshi Yoshida, "FlexDice: A Fast Clustering Method for Large High Dimensional Data Sets", Journal of Information Processing Society of Japan, Database, Vol. 46, NO. SIG 18, pp. 40-49, December, 2005;
Yusuke Naritomi and Sotaro Fuohigami, "Slow dynamics in protein fluctuations revealed by time structure based independent component analysis: The case of domain motions", The Journal of Chemical Physics 134, 065101, 2011 Feb. 14; and
Shun Sakuraba, Yasumasa Joti, Akio Kitao, "Detecting coupled collective motions in protein by independent subspace analysis", The Journal of chemical physics 133, 185102, 2010 Nov. 14.

When carrying out structural analysis of a protein using a technique such as OFLOOD, unless appropriate reaction coordinates (dimensions) are selected as the analysis coordinates, it will not be possible to extract structural changes in the protein under study. As examples, a dimension used in analysis may be the coordinate of a specific atom on a specific axis or may be the distance between two specified atoms. In the past, when performing structural analysis of proteins, relevant dimensions that are known to certain extent from experience have been used.

However, there is also the possibility that other relevant dimensions will exist in addition to the relevant dimensions that are already known. At present, there is no effective method of finding such unknown relevant dimensions. To effectively analyze structural changes of proteins, it is important to perform structural analysis of proteins having reliably selected the relevant dimensions.

The above problem relating to the difficulty in selecting the relevant dimensions to be used in structural analysis of a substance, is not limited to proteins and also applies to all structural analysis of substances with changing structures (for example, biomolecules aside from proteins).

SUMMARY

In one aspect of the embodiments, there is provided an information processing apparatus including: a memory configured to store a plurality of structures of a substance whose structure changes and a dimension group, which is a group of index dimensions that are indices for structural analysis of the substance, out of a plurality of dimensions that express a structure of the substance; and a processor configured to perform a procedure including: performing, for each of a plurality of candidate dimensions, which are not included in the dimension group, out of the plurality of dimensions, clustering of the plurality of structures in a multidimensional space that has every index dimension included in the dimension group and a candidate dimension as coordinate axes; and adding a specified candidate dimension for which it is possible to generate, a largest number of clusters to the dimension group as an index dimension.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 depicts an example of structure data of a protein;

DESCRIPTION OF EMBODIMENTS

Figure 1:
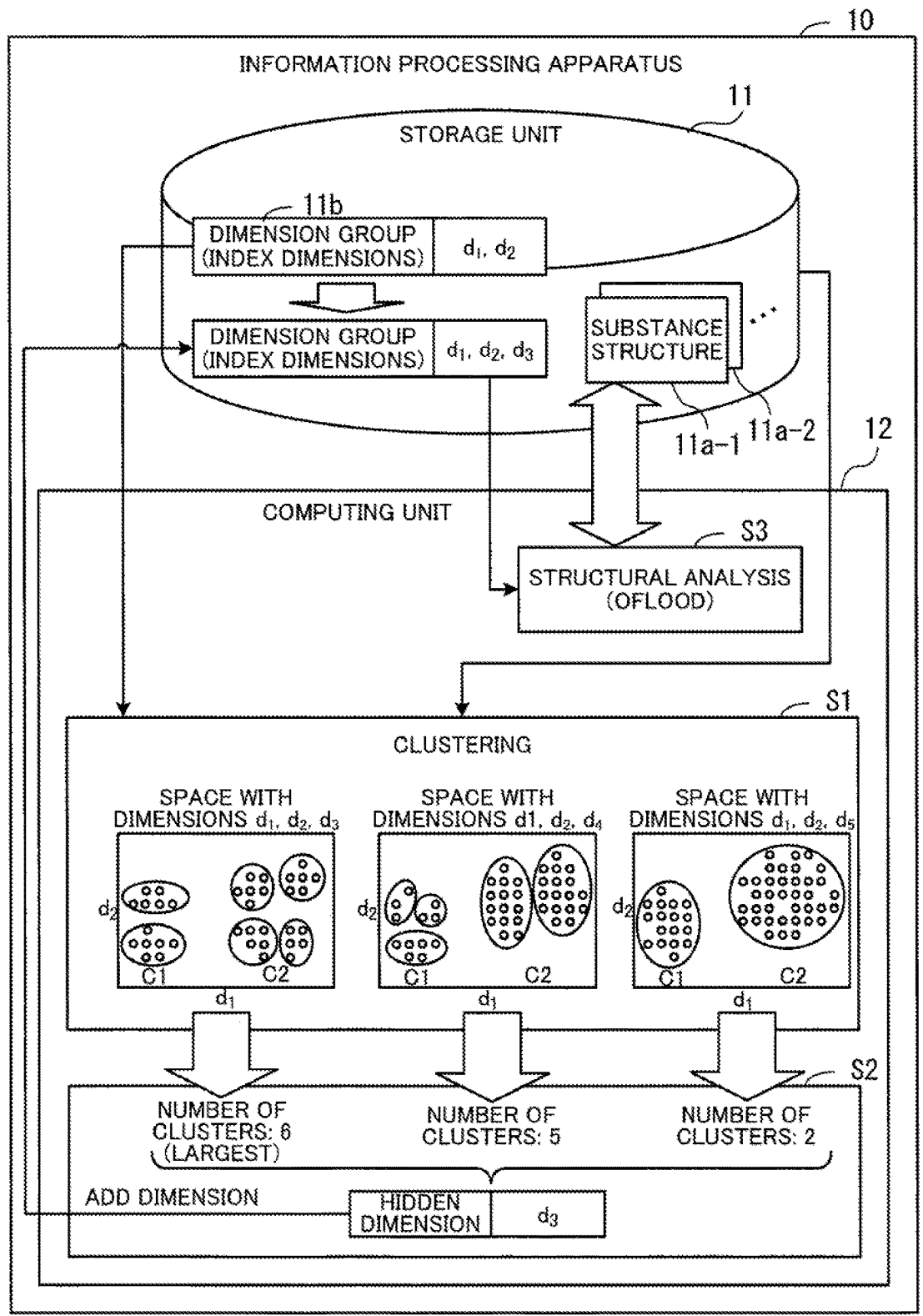
FIG. 1 depicts an example configuration of an information processing apparatus according to a first embodiment.

Several embodiments will be described below with reference to the accompanying drawings, wherein like reference numerals refer to like elements throughout. Note that the following embodiments can be implemented in combination as appropriate.

First Embodiment

First, a first embodiment will be described. The first embodiment is an information processing apparatus capable of selecting every dimension that is a relevant index for structural analysis of a substance with a changing structure.

FIG. 1 depicts an example configuration of an information processing apparatus according to the first embodiment. The information processing apparatus 10 includes a storage unit 11 and a computing unit 12.

The storage unit 11 stores a plurality of structures (substance structures 11a-1, 11a-2, . . . ,) of a substance whose structure changes and a dimension group 11b, which is a group of dimensions that are indices for structural analysis out of the plurality of dimensions that express the structure of a substance. In the dimension group 11b, as one example, dimensions that are known in advance to be relevant are set as initial values.

Out of the plurality of dimensions that express the structure of a substance, the computing unit 12 sets a plurality of dimensions that are not included in the dimension group 11b as candidate dimensions. For each dimension in the plurality of candidate dimensions, the computing unit 12 then carries out clustering of substance structures 11a-2, in a multidimensional space that has all or the index dimensions included in the dimension group 11b and also the candidate dimension as coordinate axes (step S1). As one example, assume that the plurality of dimensions that express the structure of a substance are "$d_4$, and $d_5$" and that out of these dimensions, it is already known that "$d_1$ and $d_2$" are relevant dimensions. In this case, "$d_3$, $d_4$, and $d_5$" are, the candidate dimensions. For this example, the computing unit 12 carries out clustering in a three-dimensional space with the dimensions "$d_1$, $d_2$, and $d_3$", clustering in a three-dimensional space with the dimensions "$d_1$, $d_2$, and $d_4$", and clustering in a three-dimensional space with the dimensions "$d_1$, $d_2$, and $d_5$".

The computing unit 12 then determines whether a candidate dimension, out of the plurality of candidate dimensions, for which the largest number of clusters can be generated is a dimension that is relevant but has yet to be set as an index for analysis (such a dimension is hereafter referred to as a "hidden dimension"), and adds such hidden dimension to the dimension group 11b (step S2). In the example in FIG. 1, clustering performed after the addition of dimension $d_3$ results in six clusters being generated. Clustering performed after the addition of dimension $d_4$ results in five clusters being generated. Clustering performed after the addition of dimension $d_5$ results in two clusters being generated. That is, the number of clusters is largest when dimension $d_3$ is added. For this reason, the computing unit 12 determines that dimension $d_3$ is a hidden dimension and adds dimension $d_3$ to the dimension group 11b. By adding the hidden dimension to the dimension group 11b, such hidden dimension is thereafter treated as an index for structural analysis.

In addition, every time a dimension to be set as an index for structural analysis is added to the dimension group 11b, the computing unit 12 carries out structural analysis of substances based on a plurality of structures that have the index dimensions included in the dimension group 11b as indices (step S3). As one example, the computing unit 12 performs analysis according to OFLOOD. When executing OFLOOD, the computing unit 12 carries out clustering for a plurality of structures in a multidimensional space that has the index dimensions included in the dimension group 11b as coordinate axes and performs a MD simulation with an outlier structure that is not included in any of the clusters as the initial structure.

When a MD simulation has been performed, the computing unit 12 stores the structure of the substance generated by the MD simulation in the storage unit 11. The computing unit 12 then repeatedly executes the processing in steps S1 to 33 above every time the structure of a substance is stored it the storage unit 11.

According to the information processing apparatus 10 described above, it is possible to appropriately determine hidden dimensions that are relevant out of a plurality of dimensions. As a result, it is possible to reliably use relevant dimensions as indices in structural analysis.

When structural analysis is performed using every dimension that expresses the structure of a substance, for example, is possible to perform detailed analysis. However, for a substance with a complex structure such a protein, there are a large number of dimensions and due to performance limitations on the information processing apparatus 10, it is not realistically possible to perform analysis using every dimension. For this reason, analysis is performed using selected relevant dimensions. While some dimensions are known in advance to be relevant, it is unclear whether many other dimensions are relevant. Dimensions that are not thought to be relevant may also be useful. In this way, when dimensions that are actually relevant (referred to in this specification as "hidden dimensions") are present among the dimensions whose relevance is unclear, the first embodiment is capable of automatically extracting such hidden dimensions and setting the hidden dimensions as index dimensions for structural analysis. By performing analysis having added the hidden dimensions, more detailed structural analysis is possible. In addition, since only dimensions that are believed to be especially relevant are added to the index dimensions, the addition to the computational load is minimized.

Also, according to the first embodiment, dimension for which the largest number of clusters is generated by clustering is set as a hidden dimension. By using such hidden dimensions as indices for analysis, it is possible to appropriately classify a plurality of structures of a substance using a lower number of indices. By appropriately classifying a plurality of structures of a substance, it is possible to improve the precision of analysis of structural changes and the like of a substance. As one example, when performing analysis to understand large structural changes such as movement between clusters, by accurately generating clusters, it is possible to accurately recognize the intended structural changes.

Note that the computing unit 12 can be realized by a processor provided in the information processing apparatus 10, for example. Similarly, the storage unit 11 can be realized by a memory provided in the information processing apparatus 10, for example.

Second Embodiment

A second embodiment is described below. This second embodiment is described in more detail than the first embodiment for a case where the substance to be analyzed is a protein.

Figure 2:
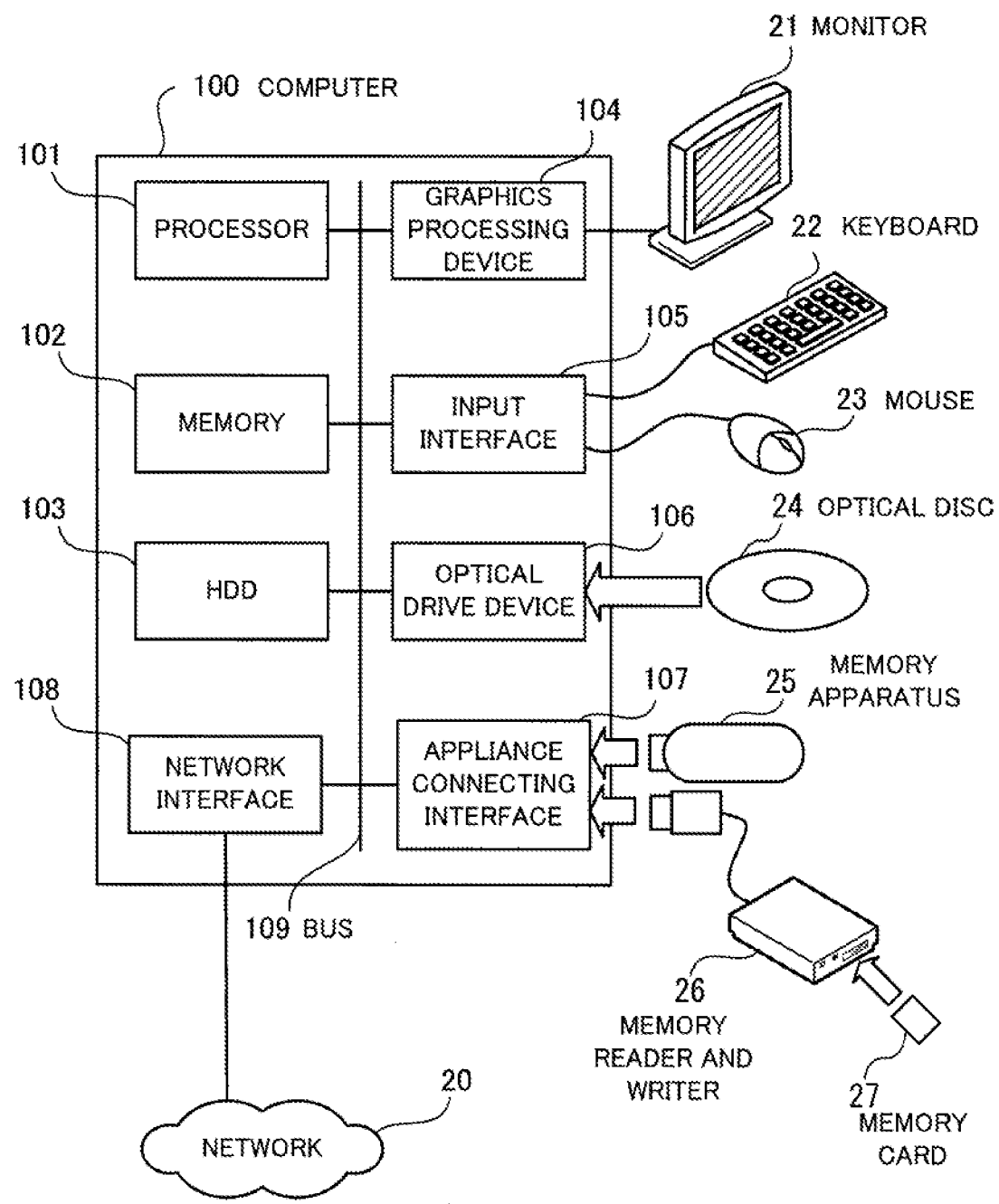
FIG. 2 depicts an example hardware configuration or a computer used in a second embodiment.

FIG. 2 depicts an example hardware configuration of a computer used in the second embodiment. The computer 100 as a whole is controlled by a processor 101. The processor 101 is connected via a bus 109 to a memory 102 and a plurality of peripherals. The processor 101 may be a multi-processor. As examples, the processor 101 may be CPU (Central Processing Unit), an MPU (Micro Processing Unit), or a DSP (Digital Signal Processor). At least some of the functions realized by the processor 101 executing a program may be realized by an electronic circuit such as an ASIC (Application Specific Integrated Circuit) and a PLD (Programmable Logic Device).

The memory 102 is used as a main storage apparatus of the computer 100. At least part of an OS (Operating System) program and an application program executed by the processor 101 is temporarily stored in the memory 102. Various data used in processing by the processor 101 is also stored in the memory 102. As one example, a volatile semiconductor storage apparatus such as RAM (Random Access Memory) is used as the memory 102.

An HDD (Hard Disk Drive) 103, a graphics processing device 104, an input interface 105, an optical drive device 106, an appliance connecting interface 107, and a network interface 108 are examples of peripherals connected to the bus 109.

The HDD 103 magnetically reads and writes data onto internally held disks. The HDD 103 is used as an auxiliary storage apparatus of the computer 100. OS programs, application programs, and various data are stored in the HDD 103. Note that as the auxiliary storage apparatus, it is also possible to use a nonvolatile semiconductor storage apparatus (SSD: Solid State Drive), such as flash memory.

The graphics processing device 104 is connected to a monitor 21. The graphics processing device 104 displays information on the screen of the monitor 21 in accordance with instructions from the processor 101. Examples of the monitor 21 include a display apparatus that uses a CRT (Cathode Ray Tube) and a liquid crystal display apparatus.

The input interface 105 is connected to a keyboard 22 and a mouse 23. The input interface 105 transmits a signal sent from the keyboard 22 or the mouse 23 to the processor 101. Note that the mouse 23 is one example of a pointing device and it is also possible to use a different pointing device. Examples of other pointing devices include a touch panel, a tablet, touch pad, and a track ball.

The optical drive apparatus 106 uses laser light or the like to read data recorded on an optical disc 24. The optical disc 24 is a portable recording medium on which data is recorded so as to be readable using reflected light. As examples, the optical disc 24 may be a DVD (Digital Versatile Disc), a DVD-RAM, a CD-ROM (Compact Disc-Read Only Memory), a CD-R (Recordable) or a CD-RW (ReWritable).

The peripheral connecting interface 107 is a communication interface for connecting peripherals to the computer 100. As examples, a memory apparatus 25 and a memory reader and writer 26 can be connected to the peripheral connecting interface 107. The memory apparatus 25 is a recording medium equipped with a function for communicating with the peripheral connecting interface 107. The memory reader and writer 26 is an apparatus that writes data onto a memory card 27 or reads data from the memory card 27. The memory card 27 is a card-shaped recording medium.

The network interface 108 is connected to the network 20. The network interface 108 carries out transmission and reception of data to and from other computers and communication devices via the network 20.

By using the hardware configuration described above, it is possible to realize the processing functions of the second embodiment. Note that the apparatus described in the first embodiment can also be realized by the same hardware as the computer 100 depicted in FIG. 2.

The computer 100 realizes the processing functions of the second embodiment by executing a program recorded on a computer-readable recording medium, for example. The program in which the processing content to be executed by the computer 100 is written can be recorded in advance on a variety of recording media. As one example, the program to be executed by the computer 100 can be stored in advance in the HDD 103. The processor 101 loads at least part of the program in the HDD 103 into the memory 102 and executes the program. The program to be executed by the computer 100 may also be recorded in advance in a portable recording medium such as the optical disc 24, the memory apparatus 25, or the memory card 27. The program stored on such portable recording medium can also be executed after being installed into the HDD 103 according to control by the processor 101, for example. It is also possible for the processor 101 to directly read and execute the program from the portable recording medium.

Structural analysis of a protein using hidden dimensions is performed by the computer 100 with the hardware described above.

Figure 3:
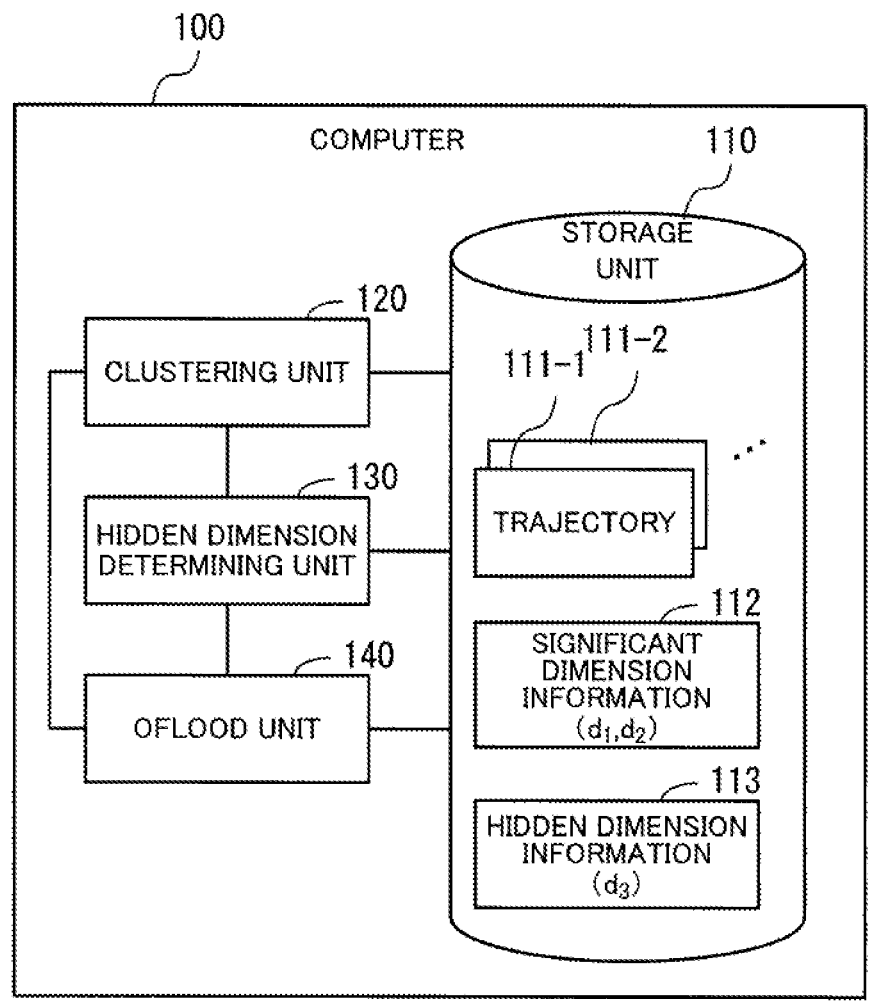
FIG. 3 is a block diagram depicting a protein structure analysis function that uses hidden dimensions.

FIG. 3 is a block diagram depicting a protein structure analysis function that uses hidden dimensions. To perform structural analysis of a protein using hidden dimensions, the computer 100 includes a storage unit 110, a clustering unit 120, a hidden dimension determining unit 130, and an OFLOOD unit 140.

The storage unit 110 stores a plurality of trajectories 111-1, 111-2, . . . , relevant dimension information 112, and hidden dimension information 113. The trajectories 111-1, 111-2, . . . , are data expressing changes over time in a protein structure. A plurality of protein structures are included in each of the trajectories 111-1, 111-2, . . . . The relevant dimension information 112 is information expressing relevant reaction coordinates (or "relevant dimensions") that are already known. The relevant dimension information 112 is information set in advance before execution of analysis of protein structures. The hidden dimension information 113 is information indicating reaction coordinates (hidden dimensions) determined to have a relevant degree of freedom in analysis of protein structures, out of the reaction coordinates aside from the relevant dimensions.

The clustering unit 120 performs clustering for the plurality of trajectories 111-1, 111-2, . . . , in a multidimensional space where another dimension (or "candidate dimension") has been added to the relevant dimensions. As one example, FlexDice is used as the clustering technique. The clustering unit 120 repeatedly executes clustering while changing the candidate dimension.

The hidden dimension determining unit 130 determines the hidden dimensions based on the result of clustering. As one example, the hidden dimension determining unit 130 acquires the numbers of clusters generated by clustering executed for each candidate dimension from the clustering unit 120. The hidden dimension determining unit 130 then determines that a candidate dimension where the clusters generated by clustering executed for only the relevant dimensions can be further divided into the largest number of clusters is a hidden dimension.

The OFLOOD unit 140 executes OFLOOD based on the relevant dimensions and the hidden dimension to visualize relaxation in the distribution of protein structures. Here, the expression "relaxation in the distribution of protein structures" refers to convergence in the changes in the protein structure. The FlexDice clustering executed during an OFLOOD procedure visualizes the changes in the distribution of clusters (i.e., metastable structures). The OFLOOD results are visualized for example by displaying, on the monitor 21, a graph where dots indicating the generated protein structures have been plotted in a space that has the reaction coordinates used in OFLOOD as axes.

Note that the functions of the elements depicted in FIG. 3 can be realized for example by having program modules corresponding to such elements executed by a computer.

Next, the information stored in the storage unit 110 will be described in detail.

Figure 4:
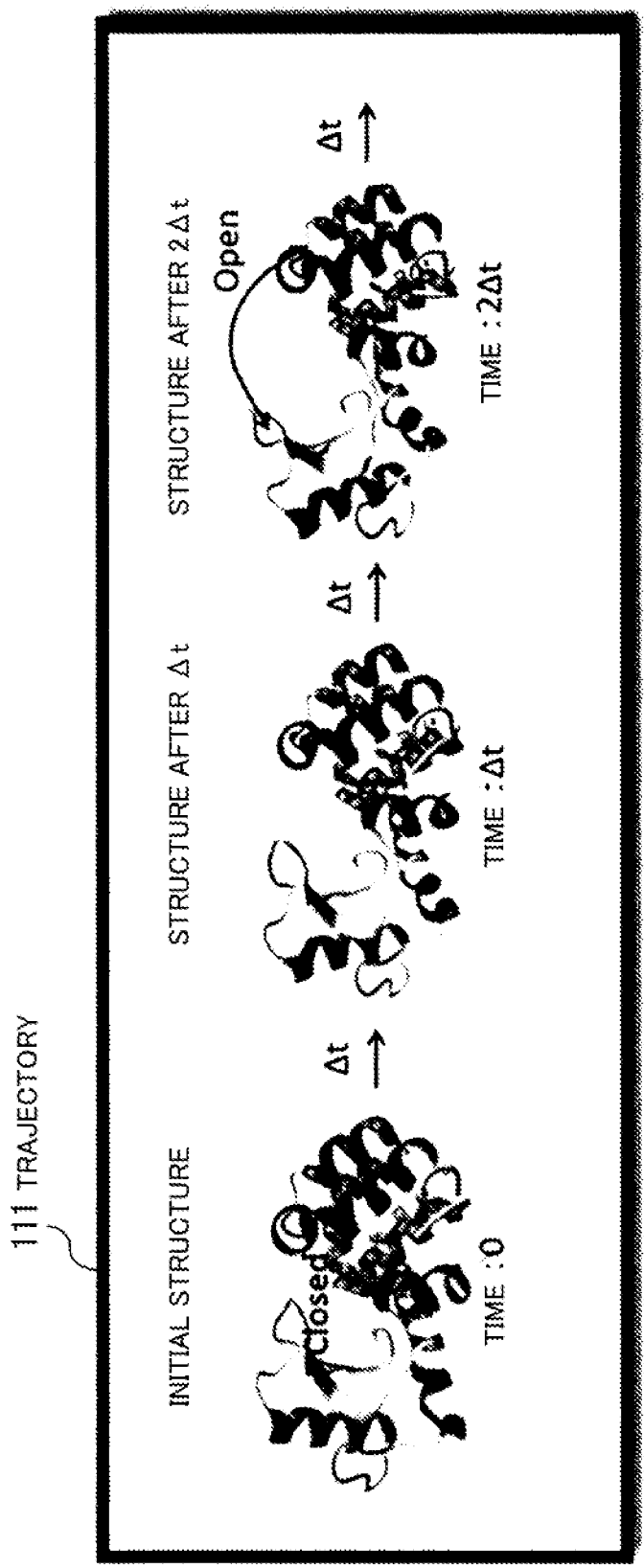
FIG. 4 depicts an example of a trajectory.

FIG. 4 depicts an example of a trajectory. The trajectory 111 depicts how a protein changes from an initial structure according to a MD simulation, for example. In the example in FIG. 4, the structure is depicted at Δt intervals during a MD simulation. The protein structures included in the trajectory 111 are expressed for example by structure data that includes the coordinates of atoms that construct the protein.

FIG. 5 depicts an example of structure data of protein. The structure data 111a is assigned an identification number of the structure. Each row that starts with "ATOM" in the structure data 111a is information on an atom included in the protein.

On each row starting with "ATOM", the atom serial number, the classification of atom type, the type of residue, the name of the molecular chain, the residue number, the X coordinate of the atom, the Y coordinate of the atom, the Z coordinate of the atom, the occupancy of the atom, the temperature factor, and the element name are set in that order toward the right.

The protein structure analysis process is described in detail below.

In the protein structure analysis process, first the trajectories generated by the MD simulation are stored in the storage unit 110.

Figure 6:
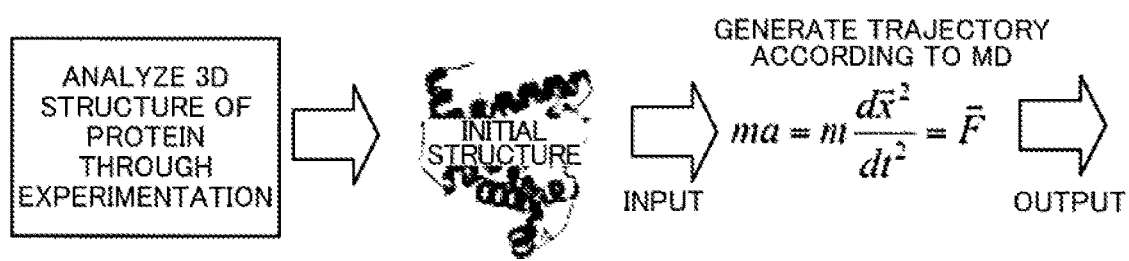
FIG. 6 depicts an example of trajectories generated by MD simulations.

FIG. 6 depicts an example of trajectories generated by MD simulations. As one example, a user performs analysis of the three-dimensional structure of a protein according to experimentation and inputs the protein structures that are the analysis result into the computer 100. It is possible to decide the three-dimensional structure of a protein using X rays or nuclear magnetic resonance (NMR) for the example. The computer 100 executes a MD simulation with the experimentally determined protein structure as the initial structure (input data). By way of the MD simulation, an equation of motion is solved based on the forces that act on a protein and a trajectory indicating changes in protein structure over time is outputted. The outputted trajectory is stored in the storage unit 110.

Based on the trajectory obtained in this way, changes in the protein structure are extracted by the OFLOOD unit 140.

Note that when OFLOOD is performed without using the technique according to the second embodiment, resampling of structures will be executed using only relevant dimensions that are known to an extent from experience. The actual problem here is that the dimensions that are relevant for changes in the structure of a protein in focus are usually nonobvious, and it is not possible to efficiently extract changes in protein structure when the optimal dimensions cannot be set.

For the above reason, in the second embodiment, the clustering unit 120 performs clustering on the trajectories obtained from a MD simulation and the hidden dimension determining unit. 130 infers that a degree of freedom relevant for changes in protein structure is a hidden dimension. By doing so, it is possible to set relevant dimensions without relying on empirical rules, which makes it possible to speed up the extraction of changes in structure by OFLOOD and to efficiently extract metastable structures.

Note that clustering of trajectories can be performed by FlexDice, for example.

Figure 7:
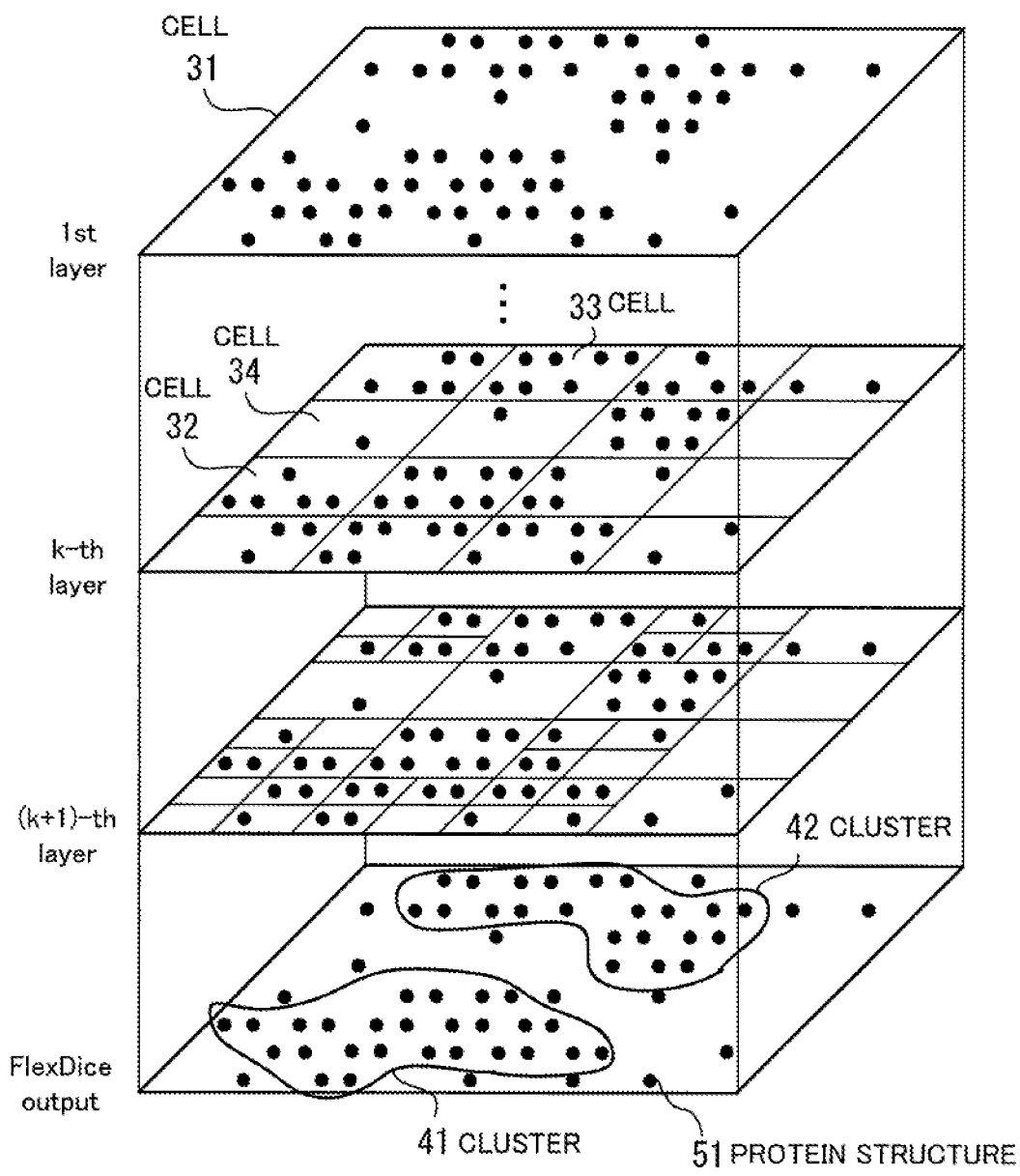
FIG. 7 depicts one example of clustering by FlexDice.

FIG. 7 depicts one example of clustering by FlexDice. FlexDice is a clustering method for finding regularities and features from a large-scale, high-dimensional database. With FlexDice, data elements are placed in a multidimensional space that has indices for classifying data elements as axes. In a case where protein structures are set as data elements, as examples the coordinate on a given axis of a specified atom and the distance between two predetermined atoms are used as indices for classifying. In FIG. 7, an example for a case where classification is carried out for two indices is depicted.

With FlexDice, a plane with two axes that respectively correspond to the two indices is defined. Each protein structure is disposed on a plane on a first layer in accordance with the values of the indices. On the first layer, one rectangular region that encompasses every protein structure is defined as a cell 31.

By dividing a cell on an upper layer in keeping with the density of protein structures in such cell, new layers numbered the second layer, the third layer, . . . are generated. As one example, if the density of protein structures in the cell is at or above an upper limit, such cell is determined to be a dense cell. If the density of protein structures in a cell is below an upper limit but equal to or above a lower limit, such cell is determined to be a medium cell. If the density of the protein structures in a cell is below a lower limit, the cell is determined to be a sparse cell. When a next lower layer after an upper layer is generated, only the middle cells out of the cells on the upper layer are divided into two in each axis direction (i.e., each cell is divided into four). As one example, cell 32 on the $k^{th}$ layer (where k is an integer of two or higher) is determined to be middle cell and is divides, into four cells on the $(k+1)^{th}$ layer. On the other hand, the cell 33 is a dense cell and is not divided, while the cell 34 is a sparse cell and is not divided.

Such generation of layers is repeatedly carried out up to a predetermined layer. Adjacent dense cells on the final layer are then combined. The groups of protein structures included in the combined cells construct the clusters 41 and 42.

During clustering according to FlexDice, a protein structure 51 not included in either of the clusters 41 and 42 is present. Such protein structure 51 is detected as an outlier.

To infer a hidden dimension, the clustering unit 120 repeatedly performs clustering as depicted in FIG. 7 while changing the candidate dimension. The hidden dimension determining unit 130 observes the number of clusters generated by clustering and determines that the dimension where there is the largest change in the number of clusters results from adding the dimension is a hidden dimension.

Figure 8:
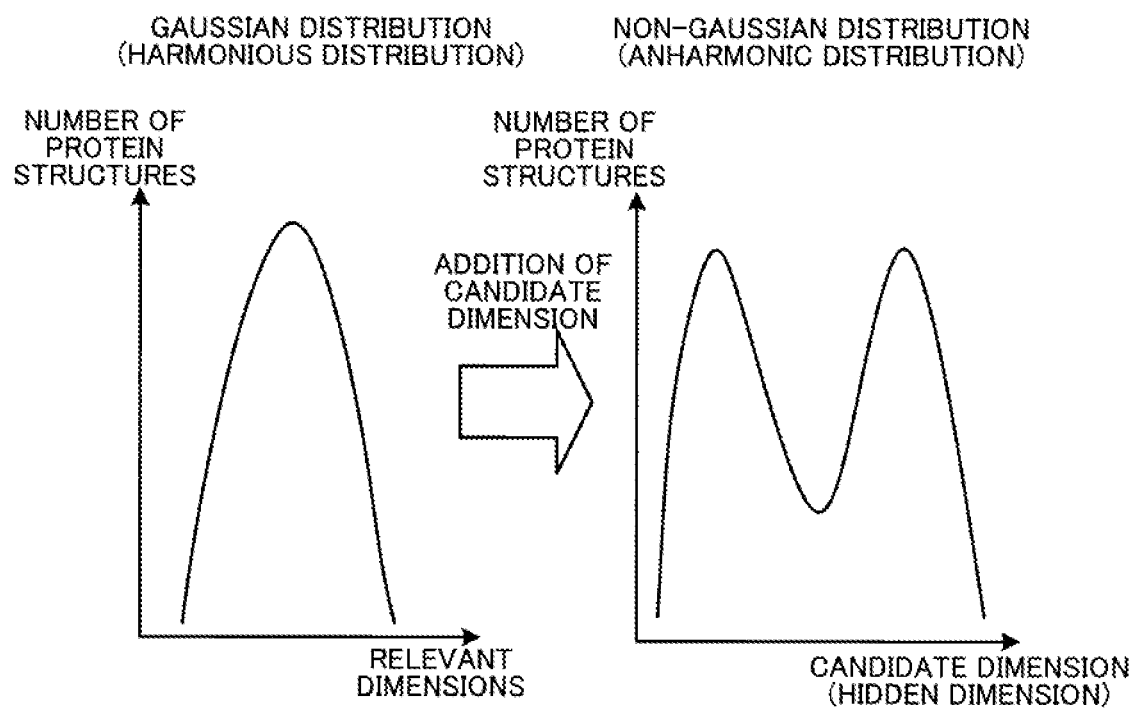
FIG. 8 depicts an increase in the number of clusters due to addition of a dimension.

FIG. 8 depicts the increase in the number of clusters due to the addition of a dimension. On the left in FIG. 8, the distribution of protein structures when known relevant dimensions are set as indices is depicted. The horizontal axis represents values of the protein structures on the relevant dimension and the vertical axis represents the number of protein structures for each value of the relevant dimension. In this example, as a result of clustering being carried out with known relevant dimensions as indices, distributions of protein structures form a. Gaussian distribution (harmonious distribution). That is, the distribution is unimodal, and only one cluster is obtained by clustering.

On the right in FIG. 8, a distribution of protein structures when the relevant dimensions and one candidate dimension are set as indices is depicted. The horizontal axis represents values of the protein structures on the candidate dimension and the vertical axis represents the number of protein structures for each value of the candidate dimension. In this example, the number of clusters changes from one (left) to two (right) due to the addition of the candidate dimension. That is, although there is one peak in the distribution before addition of the candidate dimension, anharmonicity appears in the form of two peaks (multimodality) due to the addition of the candid dimension. Due to the presence of two peaks in the distribution, two clusters are obtained by clustering.

In this way, there are cases where the number of clusters changes in a multidimensional space due to the addition of a dimension. For this reason, the hidden dimension determining unit 130 observes changes in the number of clusters when clustering is carried out according to FlexDice while changing the added dimension and determines that a candidate dimension where the distribution receives the greatest perturbation is a hidden dimension.

Figure 9:
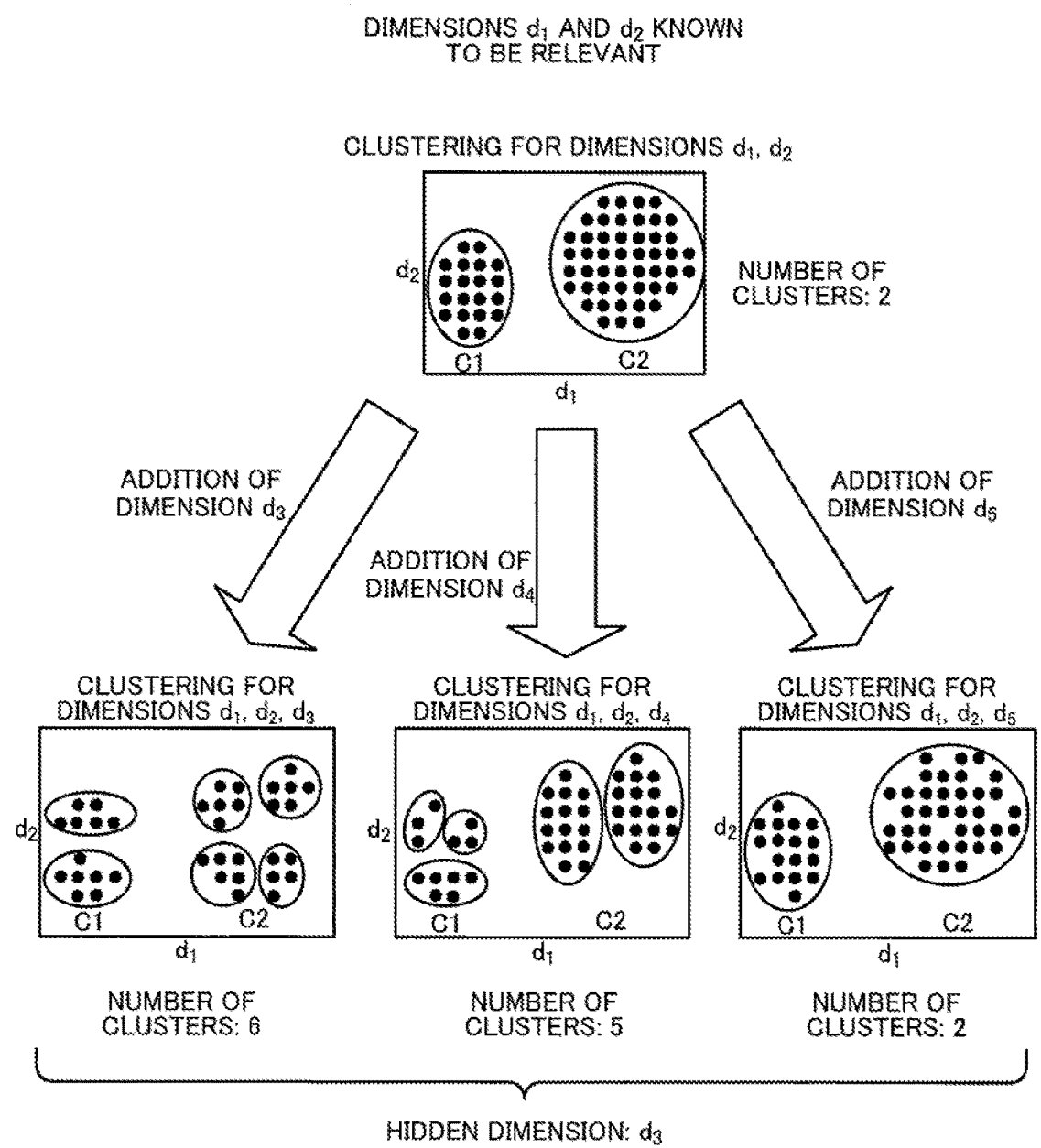
FIG. 9 depicts an example of how a hidden dimension is determined.

FIG. 9 depicts an example of how a hidden dimension is determined. In the example in FIG. 9, it is assumed that the dimensions $d_1$ and $d_2$ are already known to be relevant dimensions. In this case, clustering is carried out first for the dimensions $d_1$ and $d_2$. In the example in FIG. 9, when the metastable structures are set as C1 and C2, clusters are generated for each metastable structure the number of clusters is "2".

Here, it is assumed that the $d_3$, $d_4$ and $d_5$ dimensions are candidates for the hidden dimension. In this case, the clustering unit 120 performs clustering for the dimensions $d_1$, $d_2$ and $d_3$, clustering for the dimensions $d_1$, $d_2$, and $d_4$, and clustering for the dimensions $d_1$, $d_2$, and $d_5$. The number of clusters generated by clustering on the dimensions $d_1$, $d_2$, and $d_3$ is "6". The number of clusters generated by clustering on the dimensions $d_j$, $d_2$, and $d_4$ is "5". The number of clusters generated by clustering on the dimensions $d_1$, $d_2$ and $d_5$ is "2".

As a result, for clustering with one added dimension, it is understood that there is the largest change in the number of clusters when the dimension $d_3$ is added. For this reason, $d_3$ is determined to be a hidden dimension.

After this, changes in the number of clusters when the number of dimensions is increased by one at a time are observed and hidden dimensions are successively determined. That is, for a case where the number of dimensions is increased by one, the dimension where there is the largest increase in the number of clusters compared to before the increase in the dimensions is determined to be a hidden dimension.

Note that by having the OFLOOD unit 140 execute OFLOOD every time one hidden dimension is added, it is possible to sample and extract protein structures using more appropriate clustering. That is, the OFLOOD unit 140 uses FlexDice to cluster protein structures that have already been generated. As depicted in FIG. 7, when FlexDice is executed, a protein structure not included in any cluster is extracted as an outlier. The OFLOOD unit. 140 performs a MD simulation with the detected outlier as the initial structure to generate a trajectory.

By adding a hidden dimension and executing FlexDice it is possible, to accurately find a cluster (metastable structure) This means that the detection accuracy for outliers that are not included in clusters (i.e., are not metastable structures) also increases. Since, it is possible to detect unstable protein structures as eligible outliers, the search area of protein structures according to OFLOOD can be expanded with improved efficiency, which, makes it possible to efficiently detect native structures, for example.

Next, the procedure of the protein structure analyzing process will be described with reference to a flowchart.

Figure 10:
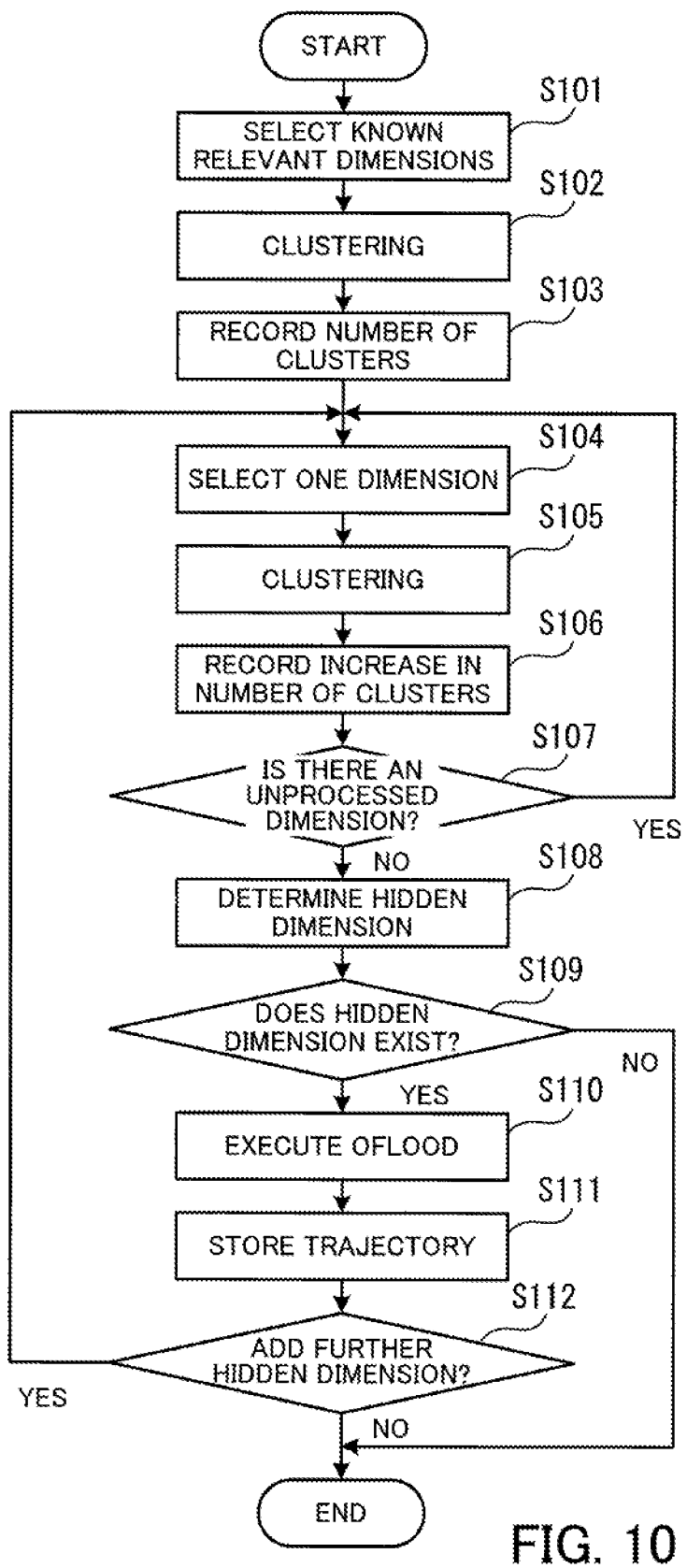
FIG. 10 is a flowchart depicting one example procedure of a protein structure analyzing process.

FIG. 10 is a flowchart depicting one example procedure of the protein structure analyzing process. The processes depicted in FIG. 10 are described below in order of the step numbers.

(Step S101) The clustering unit 120 selects the known relevant dimensions from dimensions used to describe protein dynamics. As one example, the clustering unit 120 refers to the relevant dimension information 112 in the storage unit 110 and recognizes which dimensions are relevant, dimensions. In the following description, the number of dimensions used to describe protein dynamics is assumed to be n (where n is an integer of one or higher).

(Step S102) The clustering unit 120 performs clustering on a trajectory outputted as a result of a MD simulation that has a protein structure determined by experimentations as an initial structure. As one example, the clustering unit 120 acquires structure data for a plurality of protein structures that construct a trajectory from the storage unit 110 and performs clustering according to FlexDice on the protein structures indicated by such structure data. As a result of clustering, a cluster that expresses a group of protein structures that are metastable structures is generated. The cluster generated at this time is set as "cluster A".

(Step S103) The clustering unit 120 records the number of generated clusters in the memory 102 as the number of clusters before an increase in dimensions.

(Step S104) The clustering unit 120 selects an $i^{th}$ dimension $d_i$ (where i is an integer of between 1 and n−2) that is not a known relevant dimension or dimension that has already been determined to be a hidden dimension, out of the dimensions that describe the protein dynamics. Note that the clustering unit 120 refers to the relevant dimension information 112 in the storage unit 110 to recognize which dimensions are relevant dimensions and refers to the hidden dimension information 113 to recognize which dimensions are hidden dimensions.

(Step 2105) The clustering unit 120 performs clustering according to FlexDice in a multidimensional space where the selected dimension has been added to the known relevant dimensions and the dimensions already determined to be hidden dimensions. That is, the clustering unit 120 performs clustering of a trajectory in a structural space where the number of dimensions has been increased by one by adding the dimension $d_i$. Here, the number of elements in the cluster group $A_i$ generated by clustering when the dimension $d_i$ has been added is set as $E_i$.

Note that the method of clustering executed by the clustering unit 120 in step S105 may be a method aside from FlexDice. As one example, it is possible to use a clustering method where the presence of outliers is not tolerated (i.e., where all of the elements are included in one of the cluster).

(Step S106) The clustering unit 120 records the increased number of clusters generated by clustering in step S105 from the number of clusters before the increase in dimensions in the memory 102 in association with the selected dimension.

(Step S107) The clustering unit 120 determines whether there is a dimension, out of the dimensions that describe the protein dynamics, that has not been subjected to the processing in steps S104 to S106. When there is an unprocessed dimension, the processing proceeds to step S104. When all of the dimensions have been processed, the processing proceeds to step S108.

(Step S108) The hidden dimension determining unit 130 determines that a dimension, out of the dimensions aside from the known relevant dimensions and dimensions already determined to be hidden dimensions, for which the largest number of clusters are generated compared to before the addition of the dimension is hidden dimension. As one example, when expressed mathematically, the dimension $d_i$ corresponding to i for $\max\{E_i | 1 \le i \le n-2\}$ is set as a relevant hidden dimension. Once the hidden dimension has been determined, the hidden dimension determining unit 130 adds information on the dimension determined to be a hidden dimension to the hidden dimension information 113 in the storage unit 110.

(Step S109) The hidden dimension determining unit 130 determines whether a hidden dimension exists. As one example, the hidden dimension determining unit 130 determines that a hidden dimension exists when there is at least one dimension where the number of clusters increases due to the addition of the dimension. When a hidden dimension exists, the processing proceeds to step S110. When a hidden dimension does not exist, the processing ends.

(Step S110) The OFLOOD unit 140 executes OFLOOD in a multidimensional space to which the hidden dimension determined in step S108 has been added. That is, the OFLOOD unit 140 executes clustering according to FlexDice in a space to which the new hidden dimension has been added and executes a MD simulation with an outlier as the initial structure. By executing OFLOOD, it is possible to observe relaxation in the distribution of protein structures. As one example, it is possible to observe changes in the distribution of clusters (metastable structures).

(Step 3111) The OFLOOD unit 140 stores the trajectory generated by OFLOOD in the storage unit 110.

(Step 3112) The clustering unit 120 determines whether to add another hidden dimension. As one example, when the number of dimensions determined to be hidden dimensions has not reached a predetermined number, the clustering unit 120 decides to further add a hidden dimension. When the number of dimensions determined to be hidden dimensions has reached a predetermined number, the clustering unit 120 determines that further hidden dimensions will not be added. When a further hidden dimension is to be added, the processing proceeds to step S104. When no further hidden dimension is added, the processing ends.

In this way, by observing changes in the number of clusters while adding unused dimensions one at a time and repeatedly performing OFLOOD while determining hidden dimensions, it is possible to observe relaxation in the distribution of protein structures. In addition, by adding hidden dimension for time to time, it is possible to improve the precision of determination of outliers in OFLOOD and to accurately specify a structure for which large structural changes are likely to occur. By performing a MD simulation with a structure for which large structural changes are likely to occur as the initial structure, it is possible to cause relaxation in the distribution of protein structures at high speed. The expression "relaxation in the distribution of protein structures" means convergence in the changes in protein structures and indicates that structural changes with the possibility of occurring have been sufficiently searched. That is, rapid relaxation in the distribution of protein structures means that it has been possible to efficiently search structures according to OFLOOD based on hidden dimensions.

Note that the technology according to the second embodiment can be used in a wide range of fields. For example, it is possible to reproduce slow movement of a protein that is relevant during functional analysis of such protein. Such large-scale structural changes in a protein are biologically rare events that are not possible to reproduce with a normal MD simulation, and are useful because they can be compared with experimental data as valuable structural sampling data. According to the second embodiment, investigating what kind of metastable structures are distributed in the structural space is directly linked to searching the linear free energy landscape. This means that it possible to apply the present embodiments to issues such as recognizing molecules according to Ligand binding and to use the present embodiments in drug design.

According to the above embodiments, it is possible to reliably use relevant dimensions as analysis indices during the structural analysis of substances.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store a plurality of structures of
a substance whose structure changes and a dimension
group which is a group of index dimensions that are
indices for structural analysis of the substance, the index dimensions being included in a plurality of dimensions that express a structure of the substance; and a processor configured to perform a procedure including:

performing clustering of the plurality of structures in a first multidimensional space that has every index dimension included in the dimension group as coordinate axes;

storing a number of clusters, generated by the clustering of the plurality of structures in the first multidimensional space, in the memory;

performing, for each of a plurality of candidate dimensions, clustering of the plurality of structures in a second multidimensional space that has every index dimension included in the dimension group and a candidate dimension as coordinate axes, the plurality of candidate dimensions being included in the plurality of dimensions and not being included in the index dimensions; and adding a specified candidate dimension for which it is possible to generate a largest number of clusters to the dimension group as an index dimension, when the largest number of clusters is greater than the number of clusters in the memory, to reduce computational load of the information processing apparatus.

2. The information processing apparatus according to claim 1, wherein the procedure further includes:

performing, whenever a specified candidate dimension is added to the dimension group as an index candidate, structural analysis of the substance based on the plurality of structures with every index dimension included in the dimension group as an index.

3. The information processing apparatus according to claim 2, wherein the procedure further includes:

storing, in the memory, a structure of the substance generated during the structural analysis and repeatedly executing the clustering, the adding, and the structural analysis every time the structure is stored in the memory.

4. The information processing apparatus according to claim 2, wherein the structural analysis performs clustering of the plurality of structures in a multidimensional space that has every index dimension included in the dimension group as coordinates axes and performs a molecular dynamics simulation with a structure, which is an outlier not included in any cluster, as an initial structure.

5. An index dimension extracting method comprising:

performing, by a processor, clustering of a plurality of structures in a first multidimensional space that has every index dimension included in a dimension group as coordinate axes, the plurality of structures being structures of a substance whose structure changes, the dimension group being a group of index dimensions that are indices for structural analysis of the substance, the index dimensions being included in a plurality of dimensions that express a structure of the substance;

storing a number of clusters, generated by the clustering of the plurality of structures in the first multidimensional space, in the memory;

performing, by the processor, for each of a plurality of candidate dimensions, clustering of the plurality of structures of the substance in a second multidimensional space that has every index dimension included in the dimension group and a candidate dimension as coordinate axes, the plurality of candidate dimensions being included in the plurality of dimensions and not being included in the index dimensions; and adding, by the processor, a specified candidate dimension for which it is possible to generate a largest number of clusters to the dimension group as an index dimension, when the largest number of clusters is greater than the number of clusters in the memory, to reduce computational load of the processor.

6. A non-transitory computer-readable storage medium storing a computer program, the computer program that causes a computer to perform a procedure comprising:

performing clustering of a plurality of structures in a first multidimensional space that has every index dimension included in a dimension group as coordinate axes, the plurality of structures being structures of a substance whose structure changes, the dimension group being a group of index dimensions that are indices for structural analysis of the substance, the index dimensions being included in a plurality of dimensions that express a structure of the substance;

storing a number of clusters, generated by the clustering of the plurality of structures in the first multidimensional space, in the memory;

performing, for each of a plurality of candidate dimensions, clustering of the plurality of structures of the substance in a second multidimensional space that has every index dimension included in the dimension group and a candidate dimension as coordinate axes, the plurality of candidate dimensions being included in the plurality of dimensions and not being included in the index dimensions; and adding a specified candidate dimension for which it is possible to generate a largest number of clusters to the dimension group as an index dimension, when the largest number of clusters is greater than the number of clusters in the memory to reduce computational load of the computer.

* * * * *